Figure 1:
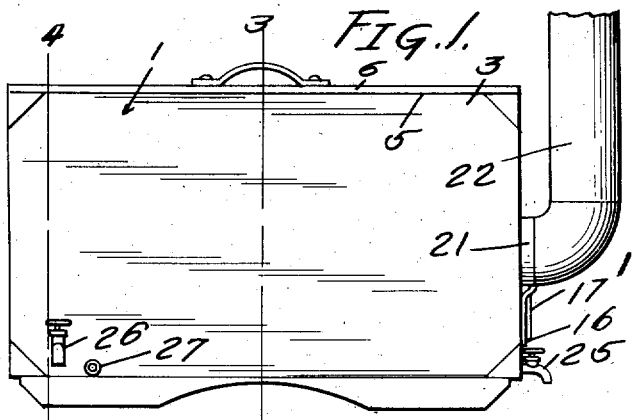

E. L. FLOWERS.

CANNING APPARATUS.

APPLICATION FILED JULY 28, 1915.

Reissued May 2, 1916. 14,123.

Inventor

E. L. Flowers

Witnesses

R. B. Cavanagh.

By Chandlee & Chandlee

Attorneys

UNITED STATES PATENT OFFICE.

EDGAR LEE FLOWERS, OF HICKORY, NORTH CAROLINA, ASSIGNOR, BY MESNE ASSIGNMENTS, TO HOME CANNER MANUFACTURING COMPANY, OF CHESTER, SOUTH CAROLINA, A CORPORATION OF SOUTH CAROLINA.

CANNING APPARATUS.

14,123. Specification of Reissued Letters Patent. Reissued May 2, 1916.

Original No. 1,109,673, dated September 8, 1914, Serial No. 789,717. Application for reissue filed July 28, 1915. Serial No. 42,431.

*To all whom it may concern:*

Be it known that I, EDGAR LEE FLOWERS, a citizen of the United States, residing at Hickory, in the county of Catawba and State of North Carolina, have invented certain new and useful Improvements in Canning Apparatus; and I do hereby declare the following to be a full, clear, and exact description of the invention, such as will enable others skilled in the art to which it appertains to make and use the same.

This invention relates to certain novel and useful improvements in canning apparatus of the type commonly employed in the canning of fruits and vegetables.

In the present instance it is my purpose to provide an apparatus which is portable in its nature and which in its entirety may be moved from place to place, as desired, even while in operation.

Still a further object of my invention is the provision of an apparatus of this class wherein the entire fire-box or furnace including the ash pit as well as the flue for the escape of the products of combustion are entirely surrounded by water so that a relatively large heat generating surface in intimate contact with the body of water within the boiler is attained, with a consequent result that the water is heated with great rapidity and consequently a considerable saving of time is attained in the canning operation.

It is also my purpose to provide a canning apparatus wherein the flue for the escape of the products of combustion extends longitudinally of the boiler, substantially in parallelism with the furnace proper, and having its top flush with the top of the furnace so that both the flue and the furnace form a rigid, firm support for the platform upon which the baskets containing the material to be canned rest.

I also aim to provide a canning apparatus wherein a maximum amount of heat is generated and brought into intimate contact with the water in the boiler with the consumption of a minimum amount of fuel, thereby conducing to economy of operation.

Furthermore, I provide a portable canning apparatus which will embody the desired features of simplicity, efficiency, reliability and convenience, and which may be manufactured and marketed at a relatively low cost.

With the above recited objects and others of a similar nature in view, my invention consists in the construction, operation and arrangement of parts set forth in and falling within the scope of the appended claims.

Figure 5:
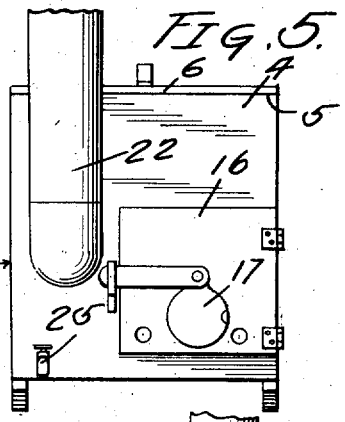
Figure 2:
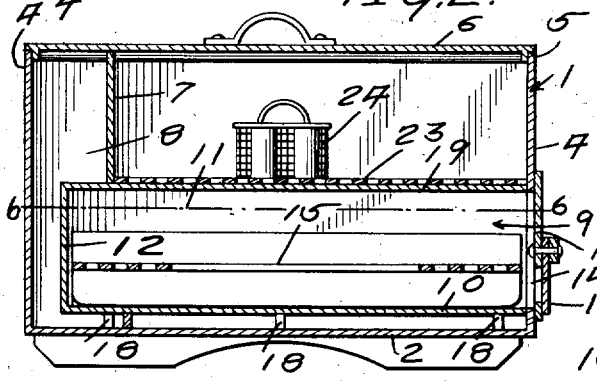
Figure 3:
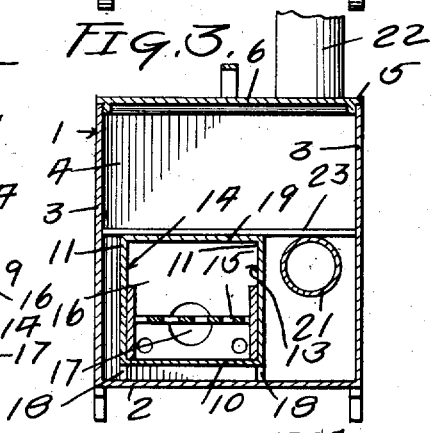
Figure 6:
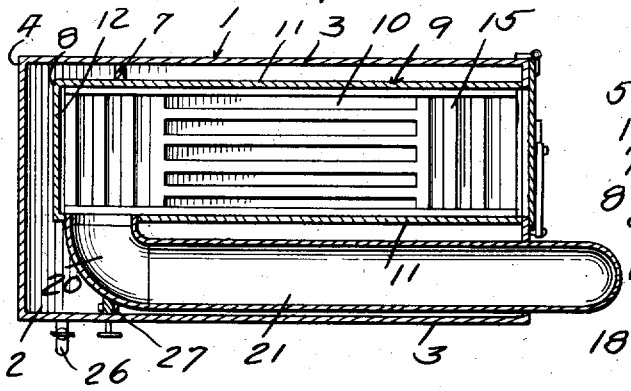
Figure 4:
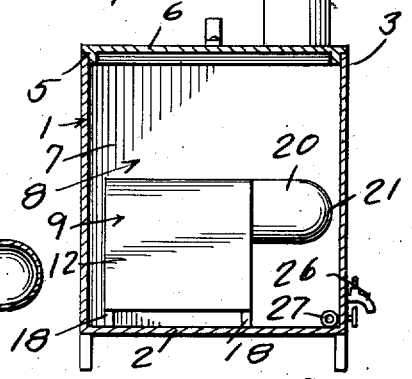

In the accompanying drawings:—Figure 1 is a view in side elevation of a portable canning apparatus embodying my invention. Fig. 2 is a longitudinal sectional view. Fig. 3 is a sectional view taken on the line 3—3 of Fig. 1. Fig. 4 is a similar view on the line 4—4 of Fig. 1. Fig. 5 is a front view. Fig. 6 is a sectional view taken on the line 6—6 of Fig. 2.

Referring now to the accompanying drawings in detail, the numeral 1 designates the boiler, which is preferably in the nature of a rectangular casing and comprises a bottom 2, sides 3, ends 4 and an open top 5 which is closed by the cover 6. The rear end of the boiler 1 is provided with a transverse partition 7 which produces a blanching or scalding chamber 8 which is closed at its upper end by the cover 6.

The furnace proper, indicated by the numeral 9, is rectangular in cross section and comprises a bottom 10, sides 11, and a closed end 12, the open end 13 of the furnace abutting against the front wall 4 of the boiler and registering with the door opening 14, so that a removable grate 15 can be supplied with suitable fuel when necessary, or removed when desired. This door opening 14 is closed by the door 16 which is provided with a suitable draft regulator 17. The furnace 9 is supported within the boiler by legs 18, and is of such dimensions and construction that its top 19, sides 11, bottom 10 and closed end 12 are spaced from the interior surfaces of the boiler 1, so that when water is in the boiler it may circulate freely around the furnace and become thoroughly heated.

The numeral 21 indicates a flue for the products of combustion having a curved or elbow section 20 which communicates with the rear or closed end of the furnace and extends through the chamber 8. The major portion of this flue 21 is in the nature of a straight pipe which extends longitudinally through the boiler in parallelism with but spaced apart from the adjacent side of the furnace 9, the top surface of the flue being substantially flush with the top 19 of the furnace so that the wooden frame 23 upon which the can containing baskets 24 are placed is adapted to rest upon and be firmly supported by both the top of the furnace and the flue as is clearly shown in Fig. 3. The straight section of the flue 21 projects at one end through the adjacent end wall of the furnace and is connected to the chimney 22 so that the products of combustion passing from the furnace will travel through the flue 21, heating the flue and consequently the water in their passage, and will leave the furnace to enter the chimney 22.

I wish to direct particular attention to the novel manner in which I have located both the furnace proper and the flue thereof within the boiler. It will be noted by reference to the drawings that the furnace and the flue are entirely contained within the boiler and are completely surrounded by water so that when the apparatus is in operation, the water is subjected to the maximum amount of heat and is consequently rapidly heated while at the same time the entire device is portable as a unitary structure. Furthermore, the only part of the furnace or flue which is located at or near the outside of the boiler is the single end which is connected with the chimney. Consequently, as the flue extends longitudinally and horizontally of the boiler and is connected with the furnace at that end of the furnace which is distant from the doors, a return flue is provided which materially assists in the efficiency and economical operation of the apparatus. By arranging the flue in position to act with the top of the furnace as a support for the tray 23, I am enabled to obtain a maximum amount of space for the insertion of a relatively large number of can containing baskets 24 within the boiler, the baskets being firmly and evenly supported upon the tray.

To one side of the boiler 1 is connected a faucet 25 which serves as a drain cock to draw water from the boiler when desired. A second faucet 26 is provided for the chamber 8 so that the latter may be drained of any water therein. The partition 7 is also provided with a valve 27 which is operable to permit water to pass from the chamber 8 to the boiler 1 should the water therein fall below the predetermined level.

While I have herein shown and described one particular embodiment of my invention, I wish to be understood that I do not limit myself to all the precise details of construction herein set forth by way of illustration, as modification and variation may be made without departing from the spirit of the invention or exceeding the scope of the claims.

What I claim is:

1. A canning apparatus comprising a boiler, a chamber formed in one end of the boiler, a cover for the upper end of the boiler, a furnace mounted in the boiler and having its bottom, sides and one end spaced from the interior surface of the boiler, the other end of said furnace being open, a door opening formed in one end of the boiler, and in registry with the open end of the furnace, a door for closing the opening, a horizontally disposed flue leading from one end of the furnace and spaced therefrom and one side of the boiler, said flue passing through the chamber and boiler to permit products of combustion to pass from the furnace and to heat the liquid in said chamber and boiler and a frame removably supported upon the furnace and flue.

2. In a canning apparatus, the combination with a boiler having a partition dividing the boiler to form a blanching chamber, a furnace located entirely within the boiler, a flue located at one side of the furnace and including an elbow section connected with the inner end of the furnace and extending through the blanching chamber and through the partition, and a straight section extending longitudinally of the boiler and substantially parallel with but spaced apart from the furnace, the outer end of the straight section of the flue extending through the adjacent wall of the boiler.

EDGAR LEE FLOWERS.

Witnesses:
R. B. CAVANAUGH,
M. E. HARTLEY.

Copies of this patent may be obtained for five cents each, by addressing the "Commissioner of Patents, Washington, D. C."